(12) United States Patent
Burian et al.

(10) Patent No.: US 7,636,467 B2
(45) Date of Patent: Dec. 22, 2009

(54) BINARIZATION OF AN IMAGE

(75) Inventors: Adrian Burian, Tampere (FI); Markku Vehvilainen, Tampere (FI)

(73) Assignee: Nokia Corporation, Espoo (FI)

(*) Notice: Subject to any disclaimer, the term of this patent is extended or adjusted under 35 U.S.C. 154(b) by 863 days.

(21) Appl. No.: 11/194,124

(22) Filed: Jul. 29, 2005

(65) Prior Publication Data
US 2007/0025625 A1 Feb. 1, 2007

(51) Int. Cl.
*G06K 9/00* (2006.01)

(52) U.S. Cl. .................. 382/154; 382/172; 382/237; 382/261; 382/270

(58) Field of Classification Search ............ 235/462.27; 358/3.22, 3.23, 466, 161; 382/154, 172, 382/237, 261, 270, 271, 272, 273; 700/28, 700/173, 250, 289, 102; 702/193
See application file for complete search history.

(56) References Cited

U.S. PATENT DOCUMENTS

| | | | | |
|---|---|---|---|---|
| 5,588,435 | A | * | 12/1996 | Weng et al. .................. 600/443 |
| 6,160,913 | A | * | 12/2000 | Lee et al. .................... 382/176 |
| 2002/0136447 | A1 | * | 9/2002 | Link et al. .................. 382/163 |
| 2003/0081828 | A1 | * | 5/2003 | Curry ......................... 382/162 |

FOREIGN PATENT DOCUMENTS

| | | |
|---|---|---|
| EP | 0811946 | 12/1997 |
| FR | 2840093 | 11/2003 |
| WO | WO 03/100713 | 12/2003 |

OTHER PUBLICATIONS

"Adaptive Document Image Thresholding Using Foreground and Background Clustering;" A.E. Savakis; Proceedings of the 1998 International Conference on Chicago, IL, Oct. 4-7, 1998; vol. 3, pp. 785-789.*

"Real-World Interaction With Camera Phones;" M. Rohs; Ubiquitous Computing Systems; Second International Symposium, WCS 2004; Revised selected papers (Lecture Notes in Computer Science vol. 3598); Springer-Verlag Berlin, Germany, Nov. 8, 2004; pp. 74-89.

"Adaptive Binarization Method for Document Image Analysis;" Meng-Ling Feng et al; Multimedia and Expo, 2004; IEEE International Conference on Taipei, Taiwan, Jun. 27-30, 2004, Piscataway, NJ, IEEE; vol. 1, pp. 339-342; Jun. 27, 2004.

(Continued)

*Primary Examiner*—Matthew C Bella
*Assistant Examiner*—Gregory F Cunningham
(74) *Attorney, Agent, or Firm*—Alfred A. Fressola; Ware, Fressola, Van Der Sluys & Adolphson LLP

(57) ABSTRACT

For binarizing an image, which is composed of pixels, the image is split into two semi-images. Local parameters are initialized based on values of pixels that lie in an area adjacent to a boundary separating the semi-images. A binarization is then performed separately for each of the semi-images using an adaptive threshold, wherein the adaptive threshold is calculated for each of the semi-images proceeding from the initialized local parameters.

21 Claims, 7 Drawing Sheets

OTHER PUBLICATIONS

"Handbook of Computer Vision Algorithms in Image Algebra;" G. Ritter et al; Chapter 4; Jul. 2005.

"Moving Average Filters;" The Scientist and Engineer's Guide to Digital Signal Processing, Chapter 15, 1998.

"Image thresholding my minimizing the measure of fuzziness;" L.K. Huang et al.; Pattern Recognition, 28, pp. 41-51, 1995.

"Dynamic thresholding of grey-level images;" J. Bernsen; Proc. $8^{th}$ Int'l Conference on Pattern Recognition, vol. 1, pp. 251-255, Paris 1986.

"An introduction to image processing;" W. Niblack; pp. 115-116, 1986.

"A fast adaptive method for binarization of document images;" L. Eikvil et al; ICDAR pp. 435-443, 1991.

"Multi-window binarization of camera image for document recognition;" In-Jung Kim; WFHR, pp. 323-327, Oct. 2004.

"Some experiments on variable thresholding;" Y. Nakagawa et al; Pattern Recognition, vol. 11, No. 3, pp. 191-204, 1979.

"Goal-directed evaluation of binarization methods;" O.D. Trier; IEEE Pattern Analysis and Machine Intelligence, vol. 17, No. 12, 1995.

"Adaptive document image binarization;" J. Sauvola et al; Pattern Recognition, vol. 33, pp. 225-236, 2000.

"Experimental comparisons of binarization and multi-thresholding methods on document images;" L.O'Gorman; Proceedings of the $12^{th}$ IAPR International Conference on Pattern Recognition, Computer Vision & Image processing, vol. 2, pp. 395-398, Oct. 1994.

"Binarization of color document images via luminance and saturation color features;" Chun-Ming Tsai et al; IEEE Transactions on Image Processing, vol. 11, No. 4, pp. 434-451, Apr. 2002.

Adaptive thresholding for the DigitalDesk, EuroPARC Technical Report; EPC-93-110, 1993.

"Document Image Binarization Using the Camera Device in Mobile Phones;" A. Burian et al; Sep. 2005.

* cited by examiner

BINARIZATION OF AN IMAGE

FIELD OF THE INVENTION

The invention relates to a method for binarizing an image, to an image processing chipset and an electronic device supporting a binarization of an image, and to a software program product, in which a software code for binarizing an image is stored.

BACKGROUND OF THE INVENTION

Information is frequently presented as a color image or a grayscale image, even though its content could be presented as a binary image. Examples for such information are printed documents, hand written notes, barcodes, some of the information displayed on TV screens both on tele-text and on the normal screen, some presentations on computer monitors, etc.

In some situations, it may be desired to convert such a color or grayscale image by means of binarization into a binary-valued image, for example in order to facilitate a document analysis or to reduce the data amount. In most document imaging systems, a binarization process typically precedes the document analyzing procedures.

Usually, binarization comprises comparing an original value of each pixel of an image with a threshold value. A binary value for this pixel may then be set to a first value, for instance to black, in case the threshold is exceeded, and to a second value, for instance to white, otherwise. The pixels of one value, for instance all black pixels, may then represent a recognized object, while the pixels of the other value, for instance all white pixels, may represent the background.

The task of implementing binarization efficiently can be quite complex. Frequently, the physical dimension of a printed text that must be binarized for a document processing application varies significantly, even on the same page. Also, if binarization of hand-written notes is to be enabled, the complexity increases.

In addition, most conventional object recognition systems were developed specifically for document images acquired by a scanner. However, the popularity of digital cameras is increasing. Also mobile phones and other mobile devices are equipped to an increasing extent with embedded camera components or with a facility for connecting an accessory device with camera components, which allow taking pictures and recording movies. Digital cameras or embedded camera components could thus be used as a new kind of input interfaces, for example for a character scanning and recognition functionality. Therefore, a need for the possibility of processing camera images as well is getting more important. Advantageously, the involved mobile device itself is equipped with image binarization facilities.

An object in a camera image is more difficult to recognize than an object in a scanner image. The reason is that with a camera, it is more difficult to control the imaging environment than with a scanner. Even if the user is assumed to take the image carefully, the processing of the obtained camera image may be problematic. Firstly, the brightness of a camera image may not be uniform because of an uneven lighting or because of an aberration of the camera lens. Secondly, the color level surface of a camera image is smoother than the color level surface of a scanner image. In other words, the edge of an object in the image, for example of a character, is not as clear as in a scanner image, and therefore, the difference in intensity between the foreground and the background varies in many camera images. Thirdly, a camera image may be distorted by sensor noise added to the captured image, as well as by optical blur and vignetting that are due to the optical system of the camera, namely the camera lenses. These problems are especially significant in camera images that are not well focused.

In order to deal with a camera image, the performance of the binarization is thus very important. However, the performance of conventional local binarization approaches depends on parameters employed in the binarization. Even if a particular set of parameters works nicely for one image, these parameters will most likely not be suitable for other images. Moreover, even if an optimal parameter is computed carefully, the binarization approach may fail to preserve important details of the structure of an object. Consequently, several problems have to be considered when binarizing a camera image.

Various methods have been developed to binarize an image. These methods can be classified into global binarization methods and local binarization methods.

In a global binarization method, the most important step consists in determining a global threshold value. This threshold value will then be used as a deciding factor for each pixel of the image. This method is based on the assumption that the input histogram is bi-modal. The advantage of this method is its simplicity and effectiveness for uniform images. But if the background or the noise characteristics are non-uniform, this approach may result in large errors.

In a local binarization method, a dedicated threshold is determined for every pixel of an image based on some local statistics. Many popular local binarization methods are window-based approaches, in which, the local threshold for a pixel (i, j) is computed from gray level values of the pixels in a window centered at (i, j). Various formulas have been proposed for computing such a local threshold.

A local binarization method has also been presented by P. D. Wellner in: "Adaptive thresholding for the Digital Desk", EuroPARC Technical Report EPC-93-110, 1993. The presented method is specifically designed for images containing printed text and uses moving averages to decide about the outcome of the binarization. The idea of this method is to run through the image while calculating a moving sum of the last n seen pixels. When the value of a pixel is significantly lower than a moving average, it is set to black, otherwise it is left white. This method requires only one pass through the image. The image is treated as a one-dimensional stream of pixels, and a moving sum that can be used for determining the moving average can be computed directly, or estimated based on the following equation:

$$M_{i+1} = M_i - \frac{M_i}{n} + p_{i+1},$$

where $M_{i+1}$ is the estimate of the moving sum for pixel $p_{i+1}$. The one-dimensional stream of pixels is taken from the camera image according to a scanning method called "boustrophedon", meaning "as the ox plows" in Greek language. That is, pixels are taken from one row progressing from the left to the right and from the next row progressing from the right to the left, etc. By using this method, a bias from one side of the image over the other is avoided. The estimated moving sum is then used as a local threshold value in accordance with the following equation:

$$P = \begin{cases} 0, & \text{if } p_i < \frac{M_i}{n}(1 - \frac{\alpha}{100}); \\ 255, & \text{otherwise,} \end{cases}$$

where P is the resulting binary value for pixel $p_i$, where n is the number of pixels considered in the moving sum, and where $\alpha$ is a fixed percentage value. The term $M_i/n$ represents the actual moving average. It has to be noted, though, that also the moving sum $M_i$ itself is frequently referred to as a moving average. A simple extension of this algorithm averages the current threshold with the one from the row above, in order to take account of illumination changes and to consider also the vertical axis of the image.

It is a likely problem of this method that the percentage value $\alpha$ used to select the threshold from the mean is fixed. Experiments show that this single value becomes insufficient when a large variety of printed text image types are being used and when different capturing conditions occur.

SUMMARY OF THE INVENTION

It is an object of the invention to provide an alternative to existing binarization solutions. It is further an object of the invention to enable a fast binarization. It is further an object of the invention to enable an efficient binarization of an image captured by a camera.

A method for binarizing an image is proposed, which image is composed of pixels. The method comprises splitting the image into two semi-images and initializing local parameters based on values of pixels that lie in an area adjacent to a boundary separating the semi-images. The method further comprises performing a binarization separately for each of the semi-images using an adaptive threshold. The adaptive threshold is calculated for each of the semi-images proceeding from the initialized local parameters.

Moreover, an image processing chipset and an electronic device are proposed. Both comprise for a binarization of an image composed of pixels an initializing portion adapted to split an image into two semi-images and to initialize local parameters based on values of pixels that lie in an area adjacent to a boundary separating the semi-images. The image processing chipset and the electronic device further comprise a binarizing portion adapted to perform a binarization separately for each of two semi-images of an image using an adaptive threshold, wherein the adaptive threshold is calculated for each of the semi-images proceeding from local parameters initialized by the initializing portion.

The proposed electronic device can be for example, though not exclusively, a mobile phone, a mobile or stationary computer of any kind, a digital camera, a personal digital assistant, or any kind of portable device comprising a camera functionality, etc.

Finally, a software program product is proposed, in which a software code for binarizing an image is stored, wherein the image is composed of pixels. When being executed by a processing unit of an electronic device, the software code realizes the steps of the proposed method. The software program product can be for instance a dedicated storage device, a memory of an electronic device that can be accessed by a processing unit of the electronic device, or a buffer of a processing unit of an electronic device into which the software code is loaded for execution, etc.

The invention proceeds from the consideration that two semi-images of an image can be binarized independently of each other, if local parameters employed in the binarization of each semi-image are first initialized based on pixels from both semi-images.

It is an advantage of the invention that the separate binarization of two semi-images enables a parallel binarization of the semi-images. This renders the binarization faster.

It is further an advantage of the invention that the employed adaptive threshold may reflect local information from a range related to a target pixel, and therefore, it is not sensitive to variation in the properties of the original image.

Usually, the pixels of a digital image are arranged in columns and rows.

The boundary separating the semi-images may then be for instance a vertical line. The initialized local parameters may comprise in this case for each row an initial sum of pixel values in this row in the area adjacent to the vertical line. The adaptive threshold may be adapted for each pixels in each row of each semi-image based on a windowed moving sum proceeding from an initial sum associated to a respective row. Alternatively, the boundary could be for instance a horizontal line. The initialized local parameters may comprise in this case for each column an initial sum of pixel values in this column in the area adjacent to the horizontal line. The adaptive threshold may be adapted for each pixel in each column of each semi-image based on a windowed moving sum proceeding from an initial sum associated to a respective column.

The proposed initialization provides an efficient way to eliminate the vignetting from the input image. The conventional boustrophedon scanning is efficient for eliminating the bias between successive rows, but the vignetting aberration quantity is different on successive rows. In fact, its character is strongly nonlinear. One option would be to use an adaptive computational length for the moving sum. But this would complicate the process significantly. The proposed new scanning is much easier to realize. Since the scanning is not performed in alternating directions anymore, but starting for every row or column anew from the computed initializations, the vignetting is simply eliminated by the independent computation on rows or columns.

Further, the separate processing in rows or columns enables in addition a parallel processing within each semi-image.

As a consequence of the smoothing capabilities of the moving sum, there is a risk that the binarization thins the thick lines in the direction of the moving sum. All the terms used to binarize a current pixel will be inside the line, but because of noisy camera sensors they will be quite different. Therefore, the binarization may decide that background is present inside the thick line.

A first approach is proposed, according to which this effect is corrected to some degree by applying adaptive local corrections to the windowed moving sum. To this end, a windowed moving sum which is determined for a particular pixel can be averaged with a windowed moving sum which is determined for a pixel adjacent to the particular pixel, before the averaged windowed moving sum is used for calculating an adaptive threshold for the particular pixel. Such an additional averaging allows increasing the local influence on the threshold value. In one embodiment of this approach, the windowed moving sum which is determined for a particular pixel is averaged at least with the windowed moving sum which is determined for a pixel preceding the particular pixel in the same row or column, in which the moving sum is determined. This embodiment ensures that the calculations for each pixel can be limited to a single row or column. Alternatively or in addition, the windowed moving sum which is determined for a particular pixel may be averaged with at least one windowed moving sum which is determined for a pixel in the preceding row or column, in which the moving sum is determined.

Moreover, a second approach is proposed, according to which the effect of thinned lines is corrected by using a secondary corrective binarization in a perpendicular direction, which totally cancels this unwanted effect. That is, the binarized image resulting with a vertical or horizontal split is considered to be only a preliminary result. In addition, the original image is split into two further semi-images in the orthogonal direction. For these further semi-images, further local parameters are initialized in the same manner as described above for the first horizontal and vertical split, respectively. The preliminary result is then corrected separately in each of the further semi-images using the further initialized local parameters. It is possible to perform such corrections on the entire preliminary binary image. In order to accelerate this processing step, however, the corrections may be limited to the object computations. This means that only those image portions are considered for a possible correction that were determined to belong to the background in the first, preliminary binarization step. Thus, the same process is carried out as in the primary direction, only in another direction and for a limited number of pixels. Each pixel that was determined in the first binarization step to belong to the background may now be determined to belong to an object as well, and the associated value is corrected accordingly.

While the first presented approach has the advantage that it is faster, the second approach has the advantage that it results in better correction solution.

It has to be noted that in the second approach, a binary output is already available before the correction is applied, so this step is supplementary. Due to the additional time consumption required for the correction, it could therefore be carried out in one embodiment only upon a request by a user, for example whenever the user is not satisfied with the obtained primary binarization.

The optimum threshold value for a pixel may depend on both local image behavior and global image behavior.

Thus, advantageously global parameters are computed in addition to the local parameters, which can be taken care of for example in parallel with the initialization of the local parameters. The calculation of the adaptive threshold for each of the semi-images may then in addition take account of the global parameters. This approach is in particular suited to adapt the adaptive threshold to various lighting conditions. It has to be noted that global parameters may be calculated for the entire image or separately for each of the semi-images. To further improve the robustness to illumination variation, each semi-image can be also divided into sub-images, for instance into two or four sub-images, etc. The global parameters can then be computed and changed for each sub-image accordingly.

If the initialized local parameters comprise initial sums of pixel values in the area adjacent to the boundary and an adaptive threshold is calculated for each pixel of each semi-image based on windowed moving sums of pixel values proceeding from a respective initial sum, an adaptive threshold for a particular pixel may be determined by applying the following operations to a windowed moving sum for the particular pixel:

1. A multiplication with a value of an adjustment function for the moving average, wherein the adjustment function has a decreasing value in a first range of moving averages, a constant value in a second range of moving averages and a further decreasing value in a third range of moving averages. The ranges are defined by a first and a second one of the computed global parameter values.

2. A multiplication with a third computed global parameter value that lies between the first and the second computed global parameter values.

As an additional operation, a division by a number of pixels considered in the moving sum could be applied, in order to convert the moving sum into a moving average. If the number is fixed, however, this operation may be performed implicitly by selecting the adjustment function accordingly.

It is to be understood that the order of the indicated operations may be selected arbitrarily.

All required parameters and functions can be computed adaptively from the input image such that there is no necessity for a calibration.

The invention can be used for grayscale images, color images and raw data coming directly from a camera sensor. If the image is a color image, it may first be converted into a grayscale image. Alternatively, however, one of the colors may be selected as a basis for the binarization, or the binarization may be performed separately for two or more colors. In this case the resulting plurality of binary images may be combined to a single binary image.

The obtained binary image can further be corrected by applying binary corrections, for example by means of a binary median filter applying a binary median filtering and/or binary morphological filters applying a binary morphological filtering.

It has already been indicated that the invention enables a high degree of parallel processing, each type of implemented parallel processing increasing the overall processing speed. Summarized, it is a possible option for a parallel processing that the initializing of local parameters is carried out in parallel with a computing of global parameters for the image; that within the initializing of local parameters for an image, in which the pixels are arranged in columns and rows, a separate initializing of local parameters is carried out in parallel for respectively at least two columns or at least two rows; that the initializing of local parameters in one direction is carried out in parallel with an additional initializing of local parameters in another direction; that within the binarization a calculation of an adaptive threshold is carried out in parallel for each of the semi-images; and/or that within the binarization for an image, in which the pixels are arranged in columns and rows, a separate calculation of an adaptive threshold is carried out in parallel for respectively at least two columns or at least two rows in a respective one of the semi-images; etc.

As the invention can be used for different kinds of images, for example for Bayer matrix images or for interpolated images, it can be incorporated into an image processing chain or it can be implemented as a separate SIS (system installation suite) package that is installed on demand.

The presented binarization can be used for example for a color quantization or to separate an object from the background. The invention may be employed for example in an image pre-processing that is the first step in a document processing system, or in an object/background separation system. The aim of the pre-processing is to obtain the best possible binary image from the input image that will enable a detection of objects or a character recognition.

The invention can further be employed for a large variety of applications. An exemplary use case is a processing, retrieval and storing of a document in form of a text instead of a color image. A further exemplary use case is a scanning and storing of notes for a later retrieval. A further exemplary use case is a scanning and storing of maps. If the binarization is good, the user does not have to consider the scanned color image to understand what is represented. A further exemplary use case is a board presentation, scanning and storing. A further exemplary use case is a scanning of text information presented on TV sets and monitor displays, like mobile phone numbers or web sites. A further exemplary use case is a pre-processing step for barcode applications, etc.

It is to be understood that the proposed image processing chipset and the proposed electronic device may comprise means adapted to realize any of the presented embodiments. Equally, the software code stored in the proposed software program product may be implemented to realize any of the presented embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
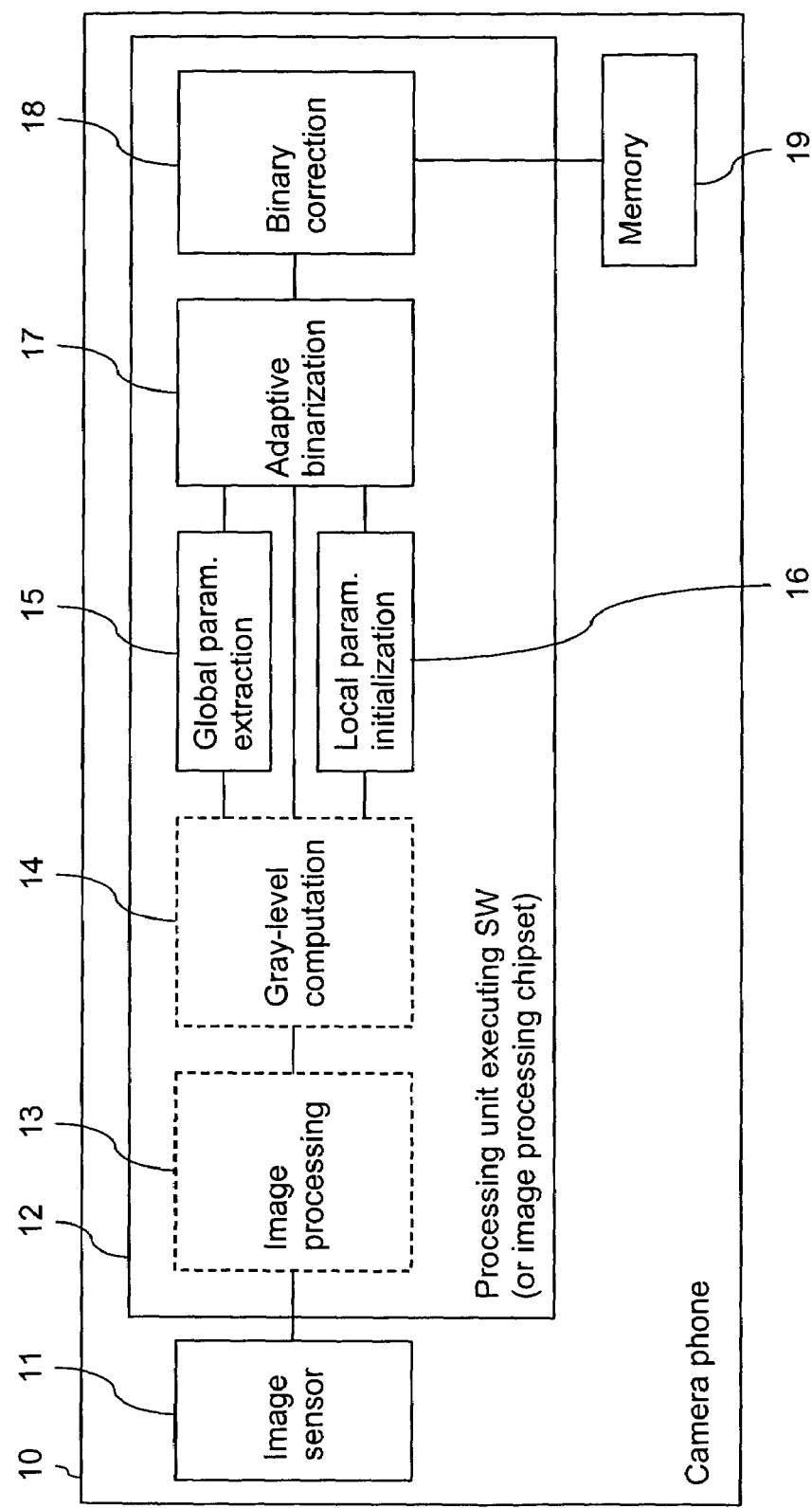
FIG. 1 is a schematic block diagram of an electronic device according to an embodiment of the invention.

FIG. 1 is a schematic block diagram of an electronic device, which enables an efficient binarization in accordance with an embodiment of the invention.

By way of example, the electronic device is a camera phone 10, that is, a mobile phone comprising embedded camera functions. It is to be understood, though, that it could be any other kind of electronic device that benefits from an efficient image binarization.

The camera phone 10 includes an image sensor 11, for instance a CCD (charge coupled device) sensor.

The camera phone 10 further includes a processing unit 12 that is adapted to execute various software program codes. The software codes include an optional image processing code 13 and binarization-related software program codes. The image processing code 13 can realize for example an imaging chain or a JPG image generator. Together with the image sensor 11, it forms a conventional image capturing portion. The binarization-related software program codes comprise an optional gray-level computation code 14, a global parameter extraction code 15, a local parameter initialization code 16, an adaptive binarization code 17, and a binary correction code 18.

The processing unit 12 could be for example a general digital processing unit of the camera phone 10, which runs software codes for various applications, or it could be a dedicated camera processing unit. Alternatively, the functions of the image processing code 13 and of the binarization-related software program codes 14-18 could be implemented for example in an image processing chipset.

The camera phone 10 further includes a memory 19.

It is to be understood that the camera phone 10 comprises in addition various other components, including components which enable a mobile communication, etc.

A binarization that may be performed by the camera phone 10 of FIG. 1 will be described in more detail with reference to FIGS. 2 to 5.

Figure 2:
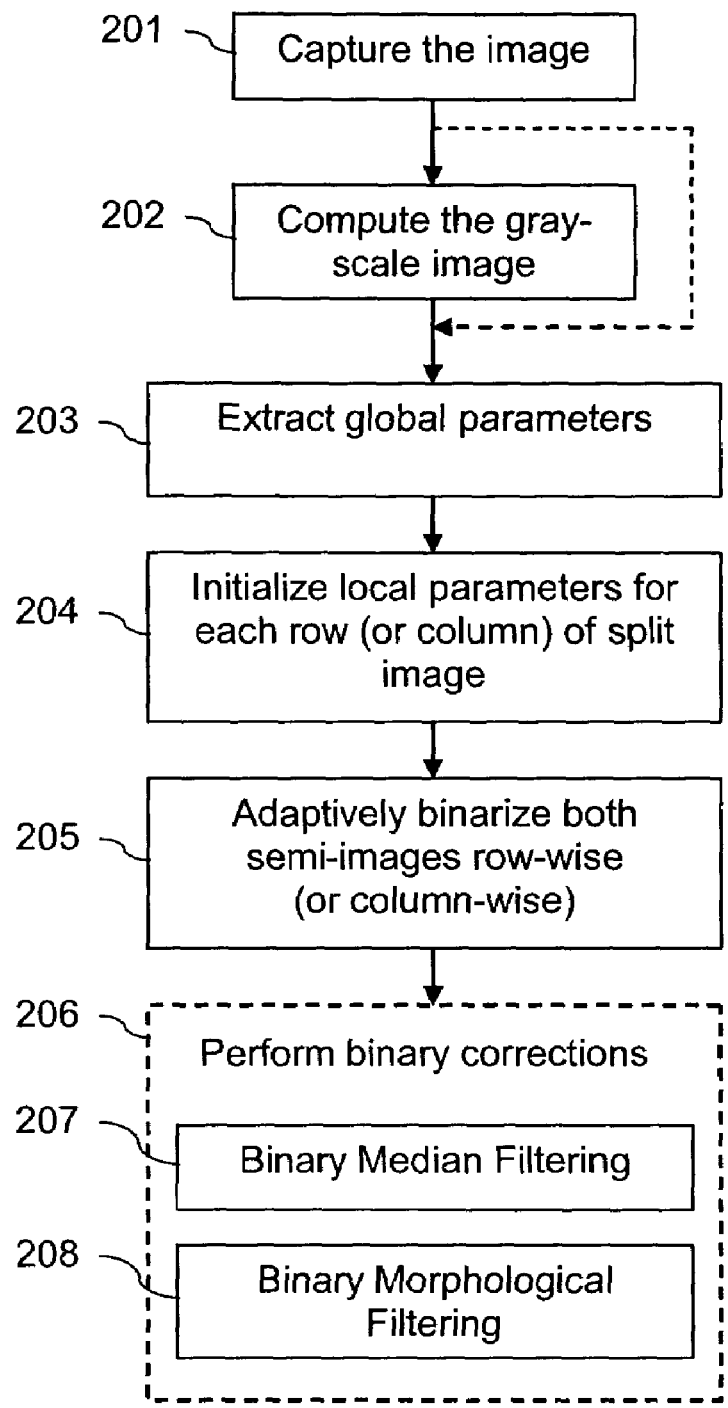
FIG. 2 is a flow chart illustrating a binarization in the electronic device of FIG. 1.

FIG. 2 is a flow chart illustrating the steps of the binarization.

In a first step, an image is captured by the image capturing portion 11, 13 (step 201). The captured image can be Bayer matrix image data obtained directly from a CCD sensor 11. Alternatively, it could be a color image output by the image processing code 13, for instance the color image output by an imaging chain or a color JPG image obtained after a compression of Bayer matrix image data. The captured image can have for example a size of 640*480 pixels, but equally any other size.

When Bayer matrix data is used, the image obtained from the sensor 11 contains four components for each pixel, namely one Red component, two Green components and one Blue component. In one embodiment, only one of the Green components and the Red component is used for the binarization. Using only selected components in the binarization has the advantage that each neglected component reduces the amount of the Bayer matrix data by one quarter, which also reduces the computational complexity and increases the processing speed of the binarization. Moreover, the Blue component is the noisiest component, so its absence facilitates in addition a process of de-noising. It has to be noted, though, that such a component selection is only of advantage, if the object that is to be binarized appears black in the input, for instance if the object is a barcode. Only in this case the absence of the Blue component does not have much of an impact.

A color component selection could be carried out for example by the image processing code 13 or by the optional gray level computation code 14.

The image data output by the image capturing portion 11, 13 is passed on to the gray level computation code 14.

The gray level computation code 14 transforms the color image into a grayscale image (step 202). This can be achieved for instance by an appropriate averaging of the selected color components Red, Green and Blue. Alternatively, simply one component of the color image, for example the Green component, could be used instead of the grayscale image. This is enough to binarize captured documents written in black and white. If the captured image contains also colored characters, better results are obtained if, for example, the Red and Green components are averaged for each pixel. If the object to be binarized appears in light colors, the Blue component should be used as well. The gray level that is associated to each pixel may be for example one of 256 possible gray levels lying in the range of 0 to 255.

The gray level computation increases the speed of the binarization, since only one component has to be further processed in the subsequent processing steps.

The obtained grayscale image data is provided to the global parameter extraction code 15, the local parameter initializion code 16 and the adaptive binarization code 17.

In a next step, several global parameters are extracted from the entire image by the global parameter extraction code 15 (step 203). These global parameters can be used as weights for local parameters, as will be explained further below, or for deciding about corrections applied during an adaptive binarization.

In one possible implementation of the global parameter extraction, the maximum value (Max) and the minimum value (Min) of the whole image are determined to this end. Global parameters D, D1 and D2 can then be derived as follows:

$$D=(Max+Min)/2$$

$$D1=(Min+D)/2$$

$$D2=(D+Max)/2$$

In another possible implementation of the global parameter extraction, histograms are used to derive the global parameters. First, the histogram of the whole image is computed. That is, for each possible gray level, the number of pixels is determined to which the respective gray level is associated. Then, D is set to correspond to the gray level in the middle of the non-zero part of the histogram. D1 is set to correspond to the highest gray level at which the histogram represents more then 10% of pixels belonging to an object, which is represented by the higher gray levels. Similarly, D2 is set to correspond to the lowest gray level at which the histogram represents more then 10% of pixels belonging to the background, which is represented by lower gray levels. For example, the gray level computation (step 202) could result in grayscale images with 256 levels of Gray. For determining the global parameters D1 and D2 by means of histograms, first, a histogram is computed for a respective grayscale image. Starting from 0 and proceeding towards 255, then a first histogram maximum Ml is computed. A maximum may be considered to have been obtained if the current value is greater than two previous values as well as the next two future values. A second maximum M2 is computed in a similar manner starting from 255 and proceeding towards 0. An object/background separation value is approximated with Sep=(M1+M2)/2. A sum S1 of histogram values is computed from 0 to Sep, and a sum S2 from Sep to 255. Then the global parameter values are obtained by D1=S1*10/100 and D2=S2*10/100.

Both implementations result in a good performance. The first implementation performs better for a more regular and not so colorful captured image, though.

In parallel or subsequently, the local parameter initialization code 16 initialized a plurality of local parameters (step 204). It has to be noted that for a subsequent initialization, the captured image data could be provided to the local parameter initialization code 16 as well via the global parameter extraction code 15, instead of directly by the gray level computation code 14.

For the initialization, the image is split along a horizontal or a vertical separation line into two equal size images. Common initial values of the local parameters for both semi-images are then determined by means of a computation that is performed on pixel values of both semi-images adjacent to the separation line.

Figure 3:
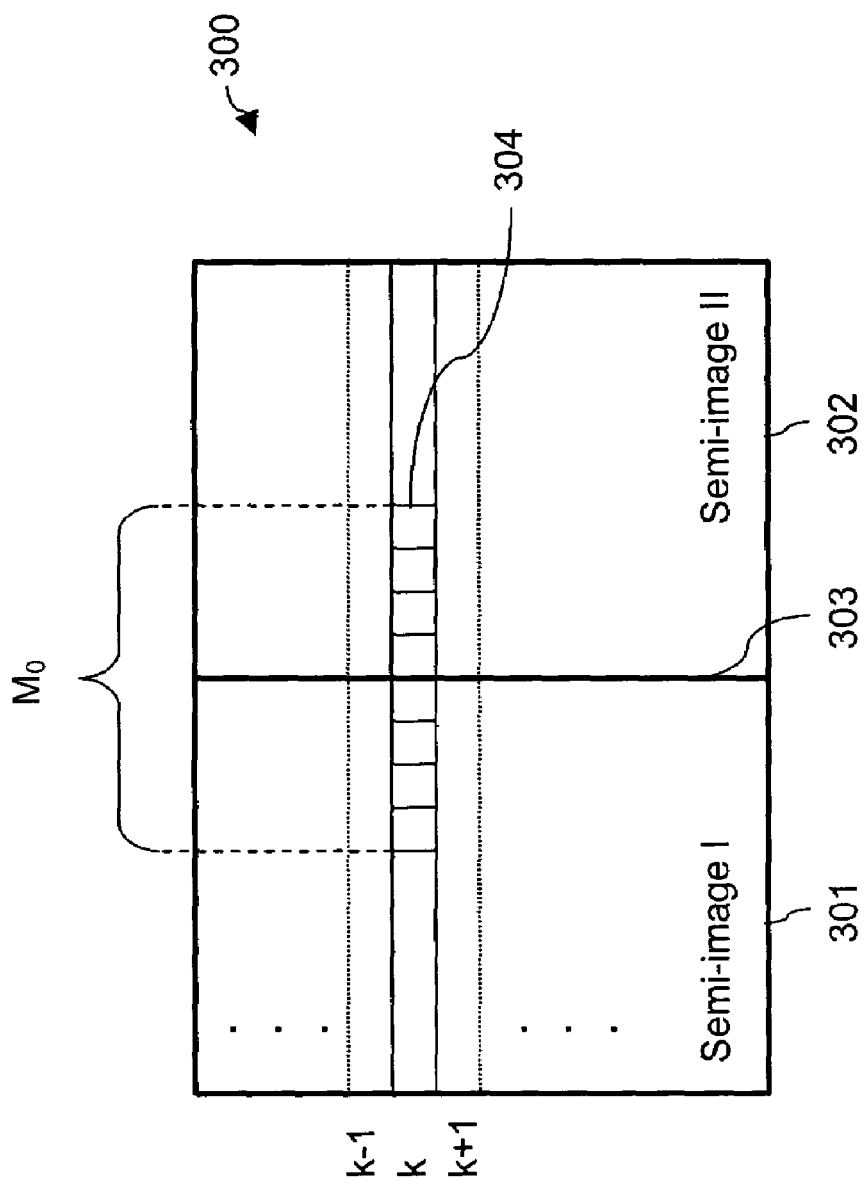
FIG. 3 is a diagram illustrating a local parameter initialization employed in the scope of the binarization of FIG. 2.

A possible computation of such common initial values is illustrated in the diagram of FIG. 3 for a vertical separation line.

FIG. 3 presents an image 300 that is split into a first semi-image I 301 and a second semi-image II 302 along a vertical initialization separation line 303. Each row k of the image 300 comprises the same number of pixels 304.

For each row k of the image 300, an initial value $M_0$ is calculated. In the given example, the initial value $M_0$ for a respective row k is sum of the four pixel values of the first semi-image I 301 located next to the vertical line in row k and of the four pixel values of the second semi-image II 302 located next to the vertical line in row k. The initial values MO are the common initial values for the semi-images 301, 302.

Alternatively, in case of a horizontal separation line, in each column of the image four pixel values from each semi-image, which are adjacent to the separation line in a particular column, are summed.

After this step 204, the further processing can be performed independently in each semi-image.

The next step (step 205) is performed by the adaptive binarization code 17 that receives as an input the extracted global parameters D, D1 and D2, the computed local initial values MO and the grayscale image data. The grayscale image data includes the gray levels of all pixels. It has to be noted that the grayscale image data could be provided to the adaptive binarization code 17 as well via the global parameter extraction code 15 and/or the local parameter initialization code 16, instead of directly by the gray level computation code 14.

The adaptive binarization code 17 performs an adaptive binarization separately for each semi-image 301, 302.

First, an adaptive threshold value is determined for each pixel of a semi-image based on the provided global parameter value and on the provided initial values.

The initial values $M_0$ are used for determining a local parameter value for each pixel $p_{i+1}$, in form of a moving sum $M_{i+1}$ by means of a central recursive implementation of moving averages, as will be explained in the following. It is to be understood that the moving averages could also be calculated directly.

Assuming that the original image is split into two semi-images 301, 302 along a vertical line 303, the processing of a respective semi-image will be carried out on rows.

Figure 4A:
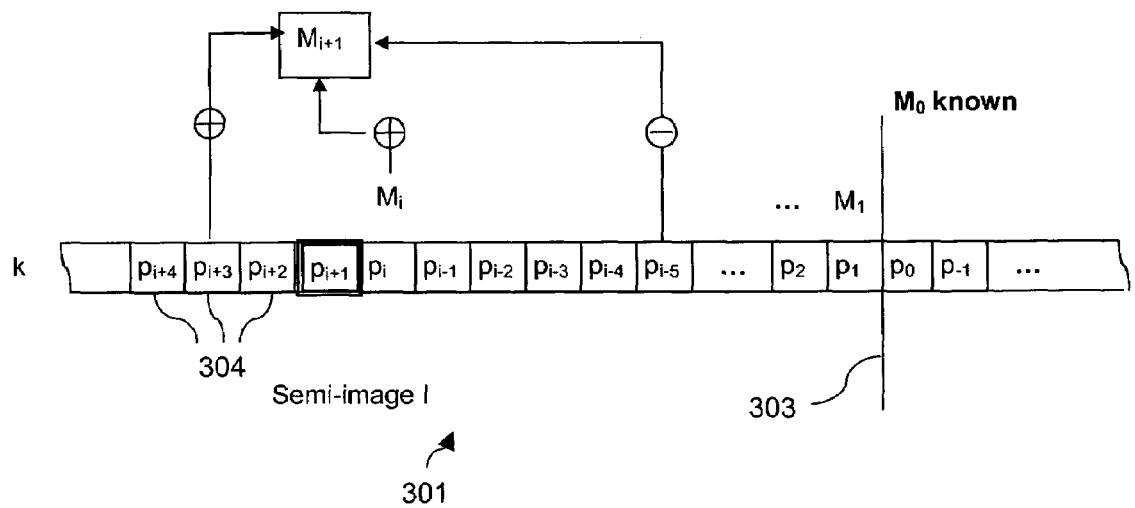
FIG. 4a is a diagram illustrating the moving sum computation employed in the scope of the binarization of FIG. 2 for a first semi-image.

FIG. 4a illustrates the determination of a moving sum $M_{i+1}$ for a pixel $p_{i+1}$, in a respective line k of semi-image I 301 according to the following equation:

$$M_{i+1}=M_i+p_{i+a}-p_{i-b},$$

Pixel $p_0$ of a respective row k is the pixel of semi-image II 302 that is adjacent to the separation line 303, and the pixel index increases towards the left. The initial value $M_0$, valid for pixel $p_0$ of a respective row k, was computed at step 204. In the given example, the variables a and b are set to a=3 and b=5 in view of the respective eight pixel values combined in the initial value $M_0$.

Figure 4B:
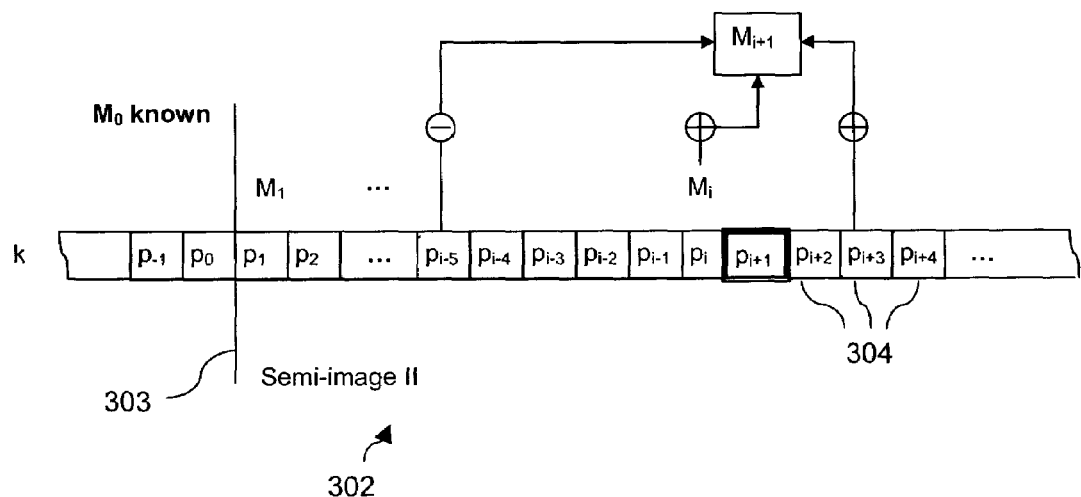
FIG. 4b is a diagram illustrating the moving sum computation employed in the scope of the binarization of FIG. 2 for a second semi-image.

Moving sums are determined in the same manner for the pixels of the second semi-image II 302, which is illustrated in FIG. 4b. In this case, pixel $p_0$ of a respective row is the pixel of semi-image I 301 that is adjacent to the separation line 303, the index of the pixels increasing towards the right.

The local influence on the desired threshold value can be increased by further averaging the current moving sum $M_{i+1}$ for pixel $P_{i+}$ with the moving sum $M_i$ computed in a preceding step for pixel $p_i$, which keeps the processing row-internal. The resulting local parameter value is denoted with H. Alternatively or in addition, the parameter value H could also be obtained by averaging the value $M_{i+1}$ for pixel $P_{i+1}$ of the current line k with the value $M_{i+1}$ for pixel $P_{i+1}$ of the preceding line k−1.

The adaptive threshold $T_i$ for pixel $P_{i+1}$ in a particular row of one semi-image can then be determined in accordance with the following equation:

$$T_i = \frac{1}{n}\left(H \cdot AP\left(\frac{H}{n}\right) + GP\right),$$

In the given example, n=8 is the window size used, GP=D/8 is a global parameter factor depending on provided global parameter value D only, and AP(x) is an adaptive parameter function depending on provided global parameter values D1 and D2.

Figure 5:
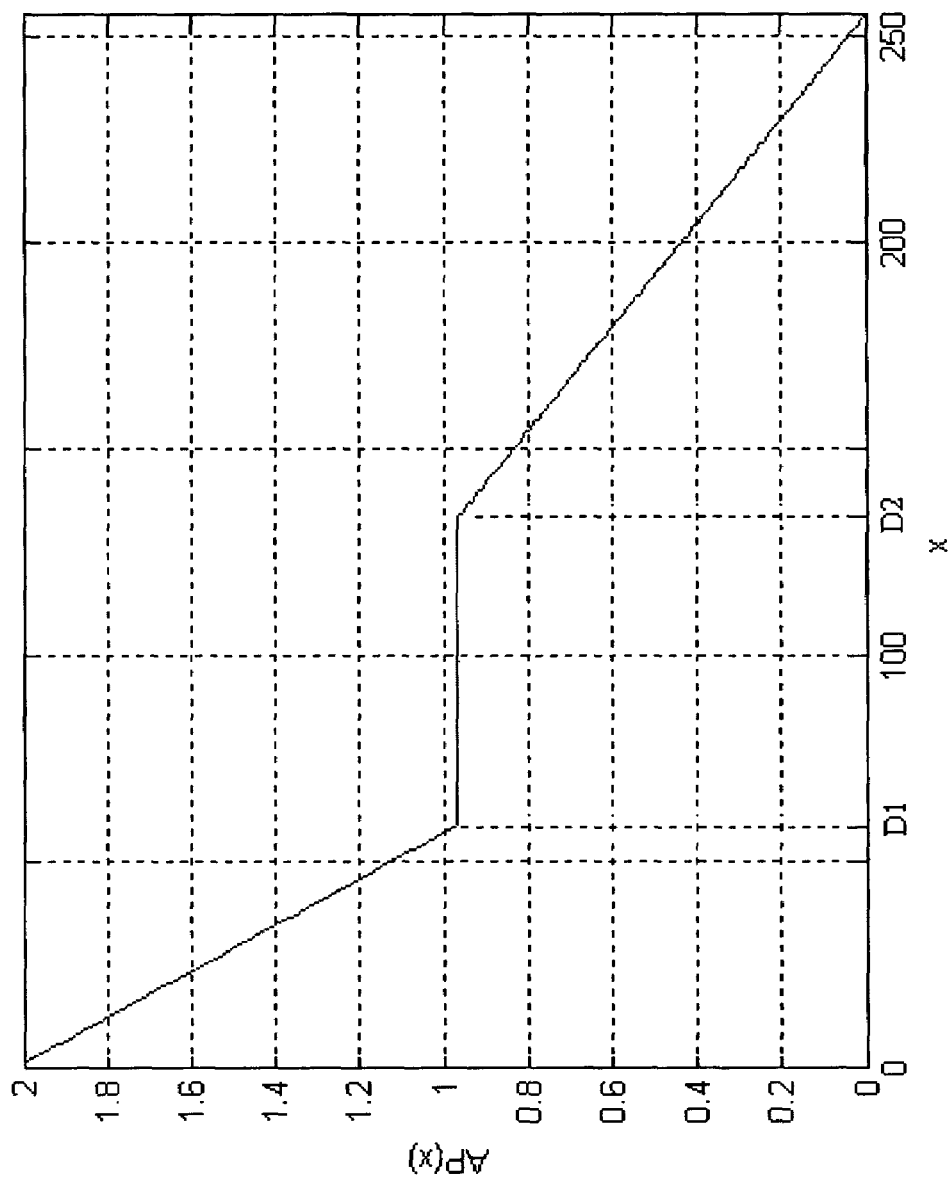
FIG. 5 is a diagram representing an adaptive parameter function employed in the scope of the binarization of FIG. 2.

The shape of the function AP(x) and the way its shape is controlled by the global parameters D1 and D2 is illustrated in FIG. 5. It can be seen that the value of AP decreases from approximately 2 to approximately 1 for a value of threshold x rising from 0 to D1. Then, the value of AP stays basically constant as the value of threshold x rise from D1 to D2. Finally, the value of AP decreases further for a value of threshold x rising from D2 to 255. It can be seen that this function will weight the adaptive threshold with a constant value only when the pixel value $P_{i+1}$ lies between the global parameter values D1 and D2. The shape of the function is adjusted automatically for a respective image based on the determined values of global parameters D1 and D2.

Once the threshold $T_i$ has been determined for a particular pixel p$i$, the adaptive binarization code 17 determines whether the gray level of the pixel $p_i$ lies above the threshold $T_i$. In case it lies above the threshold, the pixel $p_i$ is set to "black", otherwise, the pixel $p_i$ is set to "white".

It has to be noted that in case of a horizontal separation line, the processing is performed in an equivalent manner in columns instead of in rows.

Finally, the binary correction code 18 applies binary operations to the obtained binary image with the purpose of correcting the binary image (step 206). More specifically, a binary median filtering (step 207) performed by a median filter is followed by a morphological filtering (step 208) performed by morphological filters. The binary median filter is responsible for de-noising. It has the purpose to eliminate all small impulses like artefacts that may result after the binarization. The morphological filters are responsible for erosion/dilatation corrections. They have the ability to correct the shape of characters, as far as present in the image, into shapes that are more pleasant to the eye, as they make the characters appear more fluid. It has to be noted that the order of processing could also be reversed. Thus, it is also possible to first use the morphological filters and then the median filter.

A de-noising step with similar tasks could be provided instead just after the capture of the image. In this case, the image to be binarized is already cleaned by some unwanted artifacts. It is a disadvantage of this approach, however, that quite sophisticated de-noising algorithms are needed for achieving a good performance, for example a Sigma filter with 24 adjacent rows as input. For reasons of processing speed, it is therefore preferred to let the adaptive process take care of the de-noising. Experiments show that, for a larger class of captured images, the obtained results are better when the image is corrected only after the binarization. Moreover, some additional binary correction is needed even if a de-noising is performed on the captured image, which provides a further reason for implementing the whole de-noising in the binary domain.

The binarized and corrected image can then be stored for example in the memory 19 for further use. Alternatively or in addition, the binarized and corrected image could also be presented to a user on a display of the camera phone 10 or be processed by some further application, like a character recognition application or a barcode reader application, etc.

The presented binarization is adaptive without requiring any set up or tuning by the user: As the employed parameters and functions are detected and corrected automatically based on the captured image data, there is no necessity for a calibration of the system. In addition, the initialization step allows a parallel processing on columns or rows of the image in the adaptive binarization step, and thus an acceleration of the processing. Also the initialization step can be parallelized. The initialization step of the presented binarization provides moreover an efficient way to eliminate a vignetting.

It has to be noted that the presented operation can be varied in many ways.

For example, the gray level computation step 202 could be skipped, as indicated in FIG. 2 by dashed lines. In this case the subsequent steps 203-205 are performed separately for all selected color components of the captured image. That is, four separate binarizations are needed for an image of the Bayer matrix obtained directly from the CCD sensor, while three separate binarizations are needed for a color image obtained at the output of an imaging chain and for a color JPG image obtained after compression. A final result is obtained by applying an OR operation to all computed binary outputs. If the gray level image computation is absent, a very fine tuning of the binarization for all the colors present in the input image can be obtained. If a binarization of very colorful images is needed, all color components should be used.

Further, the global parameters D, D1 and D2 could equally be computed separately for each of a plurality of sub-images, instead of for the entire image. As the binarization moves into a sub-image, the global parameters and the AP(x) function are then changed accordingly. The original image can be divided to this end for example into 2, 4, 8, or 16 equally or differently sized sub-images. In case of two sub-images, the sub-images may correspond for example to the semi-images, and for more than two sub-images, each semi-image may be divided further. Using one set of global parameters or more sets of global parameters results in somehow similar performances. Some differences appear only for strongly different semi-images.

Figure 6:
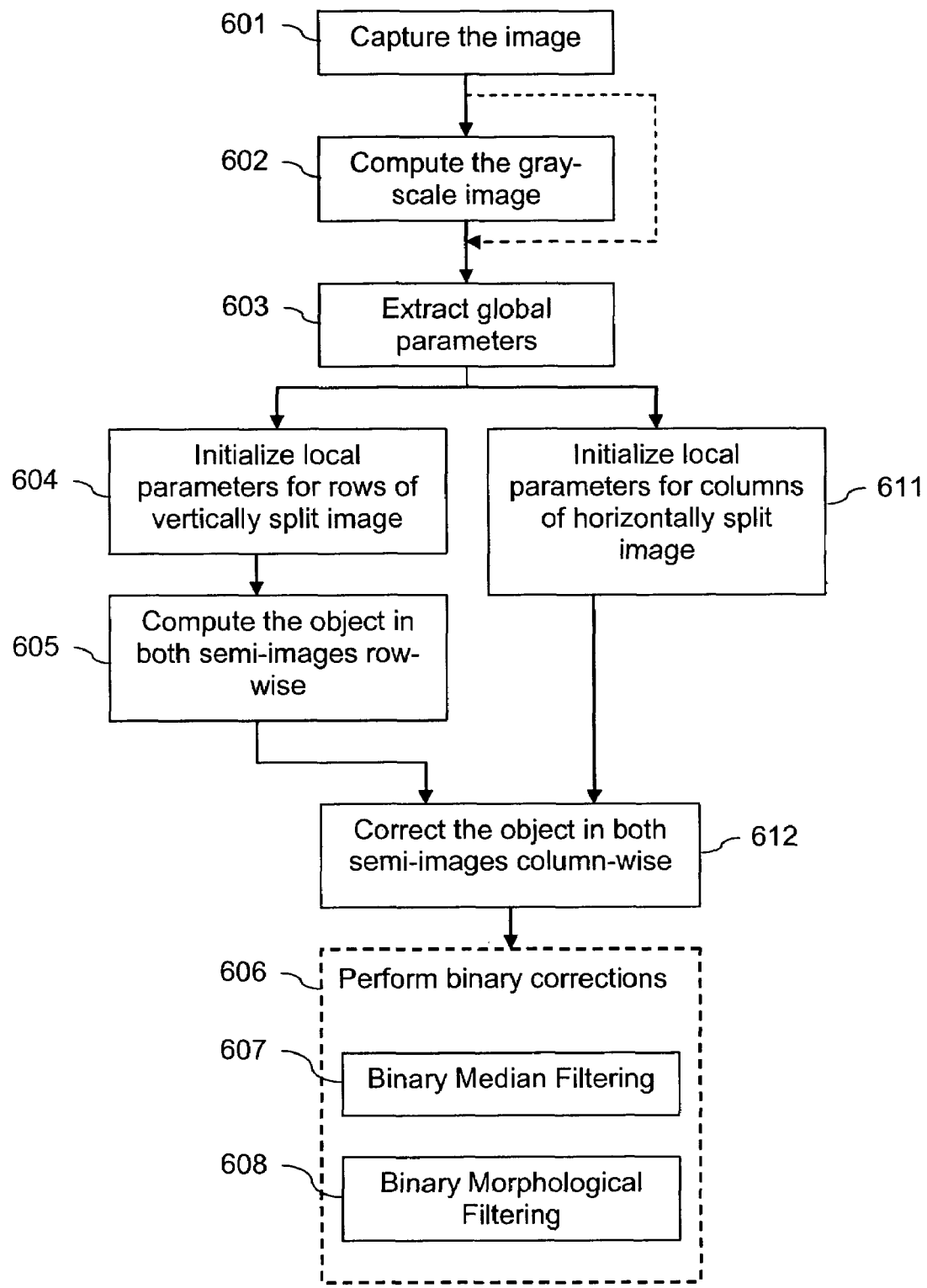
FIG. 6 is a flow chart illustrating a variation of the binarization of FIG. 2.

FIG. 6 is a flow chart illustrating a possible further variation of the binarization described with reference to FIG. 2.

In this binarization, the steps of capturing the image 601, of computing the grayscale image 602 and of extracting global parameters 603 may correspond to steps 201, 202 and 203, respectively, of FIG. 2.

Further, local parameters may be initialized (step 604) as described with reference to step 204 of FIG. 2 for a grayscale image that is split along a vertical line. The initialized local parameters may then be used for computing a binary image by rows in both semi-images (step 605), as described above with reference to step 205 of FIG. 2.

In addition, however, the same grayscale image is split along a horizontal line for initializing local parameters by columns (step 611). An initialization based on a split along a horizontal line is mentioned above with reference to step 204 of FIG. 2 as an alternative to an initialization based on a split along a vertical line.

Thus, only one split is used for the solution presented in FIG. 2, while both possible splits—in horizontal and vertical direction—are used in parallel for the solution presented in FIG. 6.

The initialized local parameters resulting with the horizontal split are then used for correcting the object obtained in step 605 independently by columns in both semi-images obtained by the split along a horizontal line (step 612). It has to be noted that only the object computation is updated. This means that for this step, the primary object detections are not taken into account. If the current pixel has already been determined to belong to an object in the primary computations of step 605, step 612 is simply skipped. So, a correction is needed only when the background was detected in the primary computations of step 605. In other words, only the pixels that had been set to "white" in step 605 are possibly corrected. If the binarization on the orthogonal direction decides that the current pixel belongs to an object as well, then the current pixel is corrected from background value to object value. Apart from the fact that a decision is only taken for a limited number of pixels in step 612, the secondary binarization corresponds exactly to the binarization described with reference to step 205 for the mentioned case of a horizontal separation line.

It is to be understood that the basic binarization (steps 604, 605) could also be performed based on a column-wise processing, while a subsequent correction (steps 611, 612) is performed based on a row-wise processing.

The resulting corrected image is then subjected to binary corrections (steps 606, 607, 608) as described above with reference to steps 206, 207 and 208 of FIG. 2.

The presented variation of a binarization in accordance with the invention has the additional advantage that the second split is suited to correct the binary image obtained in step 305 with regard to undesired lines that may be present in the obtained binary image in the direction of moving.

Figure 7A:
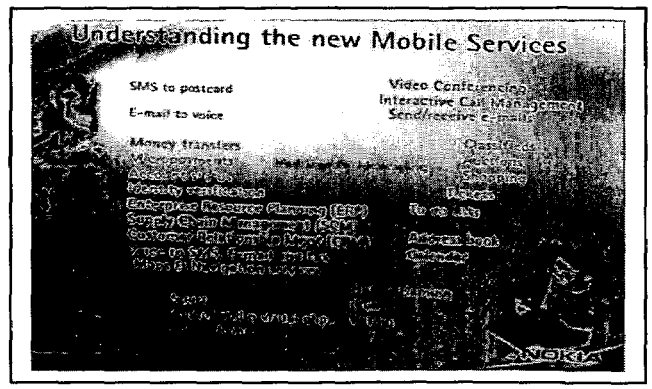
FIG. 7a is an example of an original image that is to be binarized.
Figure 7B:
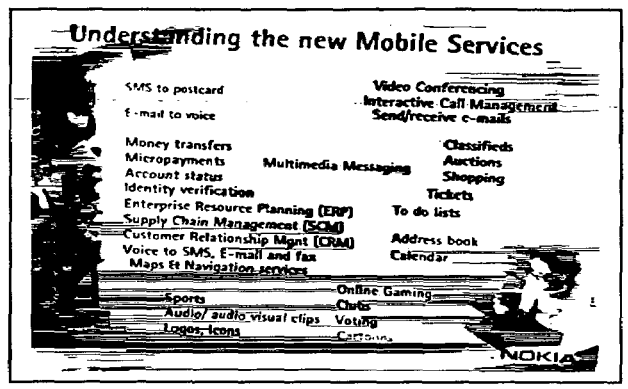
FIG. 7b is the binarized image of FIG. 7a resulting with an approach of the state of the art.
Figure 7C:
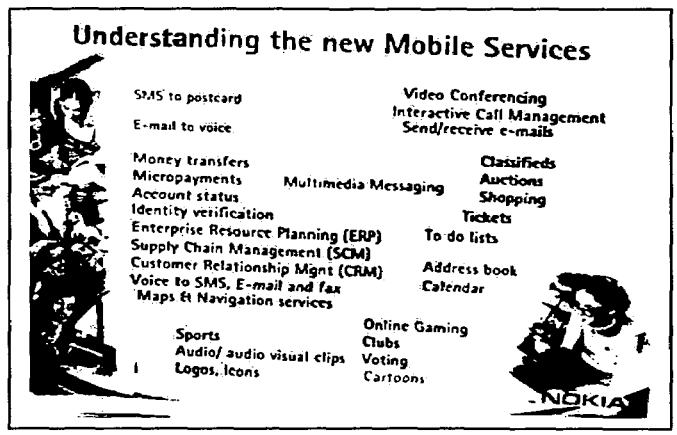
FIG. 7c is the binarized image of FIG. 7a resulting with an approach according to the invention.

FIGS. 7a, 7b and 7c illustrate the effect of the proposed binarization. FIG. 7a is a captured image that is colored in the original. FIG. 7b is a binarized image resulting with the binarization approach presented in the above cited document by Wellner. FIG. 7c is a binarized image resulting with the binarization approach according to the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
splitting an image composed of pixels into two semi-images;
initializing local parameters based on values of pixels that lie in an area adjacent to both sides of a boundary separating said semi-images;
calculating an adaptive threshold for each of said semi-images proceeding from said initialized local parameters; and
performing a binarization separately for each of said semi-images using said adaptive threshold, wherein said binarization of said semi-images results in a binarized image of said image.

2. The method according to claim 1, wherein said pixels are arranged in columns and rows, wherein said boundary is a vertical line, wherein said initialized local parameters comprise for each row an initial sum of pixel values in said row in said area adjacent to said vertical line, and wherein said adaptive threshold is adapted for each pixel in each row of each semi-image based on a windowed moving sum proceeding from an initial sum associated to a respective row.

3. The method according to claim 2, further comprising splitting said image along a horizontal line into two further semi-images, initializing further local parameters, said further initialized local parameters comprising for each column an initial sum of pixel values in an area adjacent to said horizontal line, and correcting said binarized image separately in each of said further semi-images using said further initialized local parameters.

4. The method according to claim 2, wherein a windowed moving sum which is determined for a particular pixel is averaged with a windowed moving sum which is determined for a pixel adjacent to said particular pixel, before said windowed moving sum is used for calculating an adaptive threshold for said particular pixel.

5. The method according to claim 1, wherein said pixels are arranged in columns and rows, wherein said boundary is a horizontal line, wherein said initialized local parameters comprise for each column an initial sum of pixel values in said column in said area adjacent to said horizontal line, and wherein said adaptive threshold is calculated for each pixel in each column of each semi-image based on a windowed moving sum proceeding from an initial sum associated to a respective column.

6. The method according to claim 5, further comprising splitting said image along a vertical line into two further semi-images, initializing further local parameters, said further initialized local parameters comprising for each row an initial sum of pixel values in an area adjacent to said vertical line, and correcting said binarized image separately in each of said further semi-images using said further initialized local parameters.

7. The method according to claim 5 wherein a windowed moving sum which is determined for a particular pixel is averaged with a windowed moving sum which is determined for a pixel adjacent to said particular pixel, before said windowed moving sum is used for calculating an adaptive threshold for said particular pixel.

8. The method according to claim 1, further comprising computing global parameters for said image, wherein said adaptive threshold is calculated for each of said semi-images taking in addition account said global parameters.

9. The method according to claim 8, wherein said global parameters are determined separately for each of said semi-images.

10. The method according to claim 8, wherein said initialized local parameters comprise initial sums of pixel values in said area adjacent to said boundary, wherein adaptive thresholds are calculated for pixels of each semi-image based on windowed moving sums of pixel values proceeding from a respective initial sum, and wherein an adaptive threshold for a particular pixel is determined by applying the following operations to a moving sum for the particular pixel:
a division by a number of pixels considered in said moving sum to obtain a moving average;
a multiplication with a value of an adjustment function for said moving average, wherein said adjustment function has a decreasing value in a first range of moving averages, a constant value in a second range of moving averages and a further decreasing value in a third range of moving averages, said ranges being defined by a first and a second one of said computed global parameter values; and a multiplication with third computed global parameter value that lies between said first and said second computed global parameter values.

11. The method according to claim 1, wherein said image is a color image, said method precedingly comprises converting said color image into a grayscale image.

12. The method according to claim 1, further comprising applying binary corrections to said binarized image.

13. The method according to claim 12, wherein said binary corrections comprise at least one of a binary media filtering and a binary morphological filtering.

14. The method according to claim 1, in which a parallel processing is carried out in accordance with at least one of the following:

said initializing of local parameters is carried out in parallel with a computing of global parameters for said image;

within said initializing of local parameters for an image, in which said pixels are arranged in columns and rows, a separate initializing of local parameters is carried out in parallel for respectively at least two columns or at least two rows;

said initializing of local parameters in one direction is carried out in parallel with an additional initializing of local parameters in another direction;

within said binarization a calculation of an adaptive threshold is carried out in parallel for each of said semi-images; and within said binarization for an image, in which said pixels are arranged in columns and rows, a separate calculation of an adaptive threshold is carried out in parallel for respectively at least two columns or at least two rows in a respective one of said semi-images.

15. An image processing chipset comprising:

an initializing portion configured to split an image composed of pixels into two semi-images and to initialize local parameters based on values of pixels that lie in an area adjacent to both sides of a boundary separating said semi-images; and a binarizing portion configured to perform a binarization separately for each of two semi-images of an image using an adaptive threshold, wherein said adaptive threshold is calculated for each of said semi-images proceeding from local parameters initialized by said initializing portion.

16. The image processing chipset according to claim 15, further comprising a global parameter extraction portion configured to compute global parameters for said image, wherein said binarizing portion is configured to calculate said adaptive threshold for each of said semi-images taking account of said global parameters also.

17. An electronic device comprising:

an initializing portion configured to split an image composed of pixels into two semi-images and to initialize local parameters based on values of pixels that lie in an area adjacent to both sides of a boundary separating said semi-images; and a binarizing portion configured to perform a binarization separately for each of two semi-images of an image using an adaptive threshold, wherein said adaptive threshold is calculated for each of said semi-images proceeding from local parameters initialized by said initializing portion.

18. The electronic device according to claim 17, further comprising a global parameter extraction portion configured to compute global parameters for said image, wherein said binarizing portion is configured to calculate said adaptive threshold for each of said semi-images taking account of said global parameters also.

19. The electronic device according to claim 17, wherein said electronic device is one of a mobile phone, a computer, a digital camera, a personal digital assistant, and a portable device comprising a camera functionality.

20. A computer readable medium stored with software code for binarizing an image composed of pixels, wherein said software code when executed by a processing unit of an electronic device performs:

splitting said image into two semi-images;

initializing local parameters based on values of pixels that lie in an area adjacent to both sides of a boundary separating said semi-images; and performing a binarization separately for each of said semi-images using an adaptive threshold, wherein said adaptive threshold is calculated for each of said semi-images proceeding from said initialized local parameters.

21. The computer readable medium according to claim 20, wherein when being executed by a processing unit of an electronic device said software code further realizes computing global parameters for said image, said adaptive threshold being calculated for each of said semi-images taking account of said global parameters also.

* * * * *

UNITED STATES PATENT AND TRADEMARK OFFICE
CERTIFICATE OF CORRECTION

PATENT NO. : 7,636,467 B2 Page 1 of 1
APPLICATION NO. : 11/194124
DATED : December 22, 2009
INVENTOR(S) : Burian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Twenty-first Day of December, 2010

David J. Kappos
*Director of the United States Patent and Trademark Office*